(12) United States Patent
Wijnands et al.

(10) Patent No.: US 7,529,199 B1
(45) Date of Patent: May 5, 2009

(54) SYSTEM AND METHOD FOR RESOLVING CONFLICTS IN PROXY ROUTING INFORMATION ASSOCIATED WITH MULTICAST DISTRIBUTION TREES

(75) Inventors: Ijsbrand Wijnands, Leuven (BE); Arjen Boers, Calafell (ES); Toerless Eckert, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 607 days.

(21) Appl. No.: 11/140,861

(22) Filed: May 31, 2005

(51) Int. Cl.
*H04L 12/28* (2006.01)
(52) U.S. Cl. ........................ 370/256; 370/390
(58) Field of Classification Search ................. 370/255, 370/390, 392, 400, 408, 254, 256
See application file for complete search history.

(56) References Cited

U.S. PATENT DOCUMENTS

| | | | |
|---|---|---|---|
| 5,917,820 A * | 6/1999 | Rekhter | 370/392 |
| 6,078,590 A | 6/2000 | Farinacci et al. | 370/432 |
| 6,331,983 B1 * | 12/2001 | Haggerty et al. | 370/400 |
| 6,501,755 B1 * | 12/2002 | McAllister et al. | 370/256 |
| 2003/0012193 A1 * | 1/2003 | Novaes | 370/390 |
| 2004/0081171 A1 * | 4/2004 | Finn | 370/395.53 |
| 2005/0047353 A1 * | 3/2005 | Hares | 370/255 |
| 2008/0063003 A1 * | 3/2008 | O'Neal | 370/408 |

OTHER PUBLICATIONS

Boers, A., Wijnands, I.J., Rosen, E., "Format for Using PIM Proxies," http://www.ietf.org/internet-drafts/draft-ietf-pim-proxy-00.txt, Feb. 2005, pp. 1-7, printed May 23, 2005.
Boers, A., Wijnands, I.J., Rosen, E., "The RPF Vector Proxy," http://www.ietf.org/internet-drafts/draft-ietf-pim-rpf-vector-00.txt, Feb. 2005, pp. 1-8, printed May 23, 2005.

* cited by examiner

*Primary Examiner*—Kevin C Harper
*Assistant Examiner*—Wanda Z Russell
(74) *Attorney, Agent, or Firm*—Campbell Stephenson LLP; Brenna A. Brock (57) ABSTRACT

A first message, received from a first device, identifies a multicast distribution tree and includes first information associated with a route leading to a root of the multicast distribution tree. A second message, received from a second device, also identifies that tree, but the second message includes second information, which conflicts with the first information. In one embodiment, the conflict is resolved by building a first version of the tree based on the first information and building a second version of the tree based on the second information. The first version is used to forward multicast packets to the first device, while the second version is used to forward multicast packets to the second device. In another embodiment, the conflict is resolved by selecting either the first information or the second information, based on a policy, and then building a single version of the tree corresponding to the selected information.

17 Claims, 9 Drawing Sheets

SYSTEM AND METHOD FOR RESOLVING CONFLICTS IN PROXY ROUTING INFORMATION ASSOCIATED WITH MULTICAST DISTRIBUTION TREES

FIELD OF THE INVENTION

This invention relates to networking and, more particular, to resolving conflicts in information contained in multicast join messages.

DESCRIPTION OF THE RELATED ART

Network devices within the same network can be divided into two categories: "edge" devices and "core" devices. Edge devices are devices that attach directly to users or to other networks. In contrast, core devices attach only to other devices (i.e., other edge and core devices) that are part of the same network. In such an implementation, core devices simply keep track of routes within the network, while edge devices maintain knowledge of both internal routes within the network and external routes that lead outside of the network. For example, an edge network device can maintain routing information for an external route that identifies which edge device is the best exit point from the network for a given destination Internet Protocol (IP) address. Such a network can be implemented by enabling the core devices to perform Multi-Protocol Label Switching (MPLS) protocol. The edge devices can then include appropriate MPLS labels in packets in order to "tunnel" packets to other edge devices via the core devices.

In situations in which core devices do not maintain knowledge of external routes, core devices may not be able to process multicast join messages. Typically, a network device handles a multicast join message by forwarding the join message towards the root of a multicast distribution tree (the root can be the source device or a rendezvous point device) and storing information representing the multicast distribution tree, if such information does not already exist. To be able to process the multicast join message, the receiving network device needs to know how to send the multicast join message towards the root of the multicast distribution tree. If the root of the tree lies outside the network (i.e., if the root can only be reached via an external route), a core device will not know the external route needed to reach the root and will thus be unable to process a multicast join message. As a result, it may be difficult or even impossible to implement multicast efficiently in such a network, without requiring core devices to maintain routing information for routes leading out of the network.

One solution that allows multicast join messages to be processed by core devices without requiring core devices to maintain routing information for external routes involves having edge device provide routing information for external routes to core devices in multicast join messages. For example, an edge device can include routing information identifying an edge router along the route leading to the root of the multicast distribution tree. A core device can use this information to generate information corresponding to the multicast distribution tree, as well as to forward the multicast join message toward the root of the tree.

BRIEF DESCRIPTION OF THE DRAWINGS

A more complete understanding of the present invention may be acquired by referring to the following description and the accompanying drawings, in which like reference numbers indicate like features.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

Figure 1:
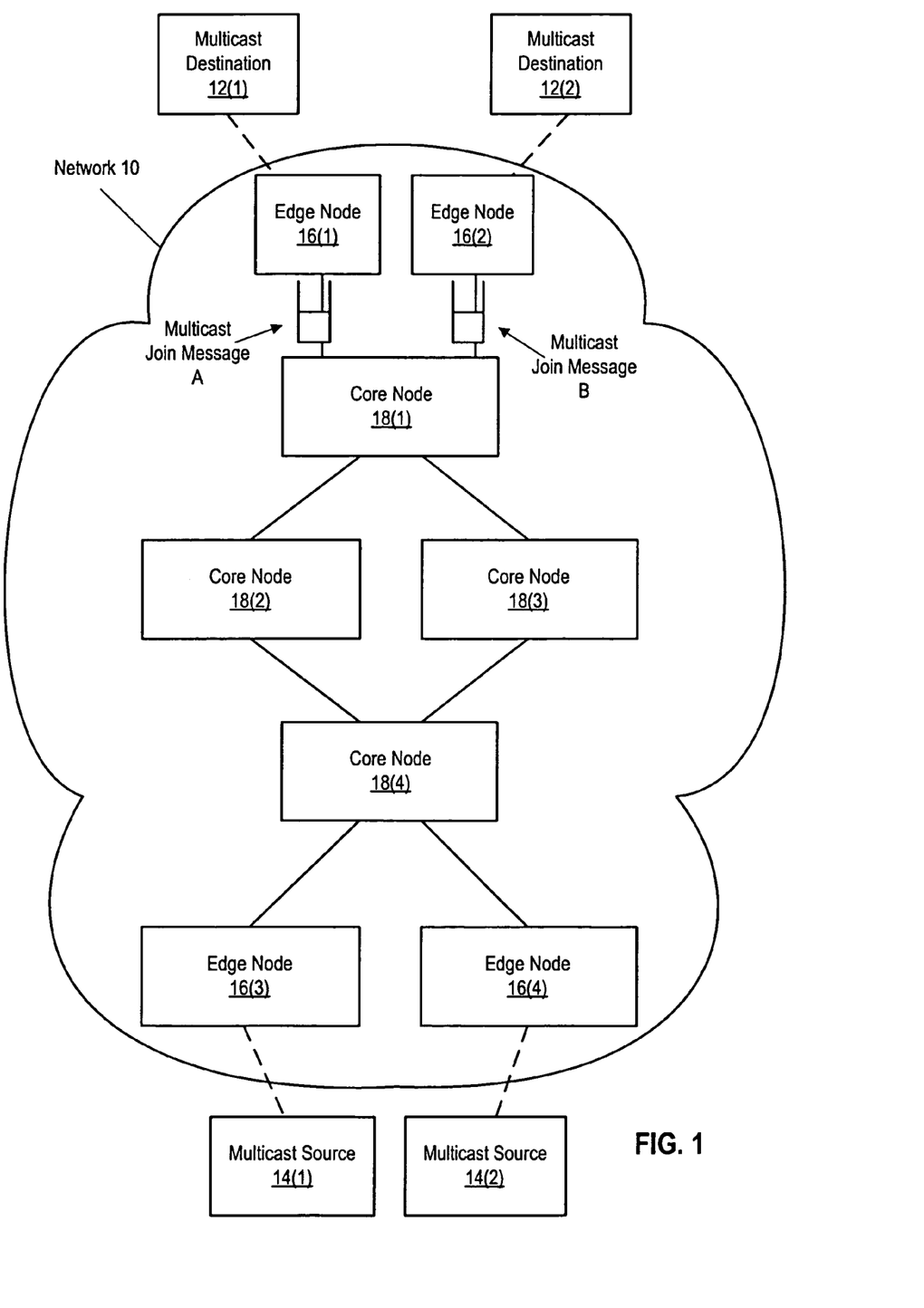
FIG. 1 is a block diagram of a network, according to one embodiment of the present invention.

FIG. 1 is a block diagram of a network 10 that couples two multicast destinations 12(1) and 12(2) to a pair of redundant multicast sources 14(1) and 14(2). The dashed lines connecting multicast destinations 12(1) and 12(2) and multicast sources 14(1) and 14(2) to network 10 indicate that these devices can be coupled to network 10 by one or more intervening networks. Network 10 can include one or more local area networks (LANs) and/or wide area networks (WANs). Network 10 can be implemented using any (or a combination) of a variety of different media, including wireless links, satellite links, coaxial cables, fiber optic cables, and the like.

Network 10 includes several edge nodes 16(1)-16(4) as well as several core nodes 18(1)-18(4). Edge nodes 16(1)-16(4) (collectively, edge nodes 16) and core nodes 18(1)-18(4) (collectively, core nodes 18) include various network devices (e.g., routers and/or switches) that perform routing functions and support one or more routing protocols.

As shown, multicast destination 12(1) is coupled to edge node 16(1). Similarly, multicast destination 12(2) is coupled to edge node 16(2). Edge nodes 16(1) and 16(2) are coupled to core node 18(1). Core node 18(1) is coupled to core nodes 18(2) and 18(3), which are in turn each coupled to core node 18(4). Core node 18(4) is coupled to edge nodes 16(3) and 16(4), which are both coupled to multicast sources 14(1) and 14(2). It is noted that one device can be coupled to another device either directly by a physical link or indirectly by, for example, an intervening network, a logical tunnel, or several physical links and intervening network devices.

Multicast sources 14(1) and 14(2) are each configured to send one or more data streams to a multicast group address G. Multicast sources 14(1) and 14(2) are computing devices (e.g., a host computer systems, personal digital assistants, cell phones, network appliances, network devices, or the like) that encode a data stream for transmission via network 10 and then send messages containing the encoded data stream to subscribers via network 10. For example, multicast source 14(1) and 14(2) can each include a video head end that receives a video stream, prepares that video stream for transmission, and sends messages that encode the video stream to subscribers via network 10. While FIG. 1 illustrates multiple multicast sources that provide the same multicast stream to the same multicast address, it is noted that other embodiments can include a single multicast source and/or multiple multicast sources that provide the same and/or different streams of data to the same and/or different multicast addresses. Additionally, a single multicast source can source several different streams of data to the same and/or different multicast addresses.

Multicast destinations 12(1)-12(2) are computing devices that subscribe to multicast group G (e.g., by sending an Internet Group Management Protocol (IGMP) group report to a network device, which causes the network device to generate a multicast group join according to, for example, Protocol Independent Multicast (PIM) Source Specific Multicast (SSM) protocol). Multicast destinations 12(1)-12(2) then receive the data stream addressed to multicast group G via network 10, decode the data stream, and present the decoded data stream to users (e.g., via a display device such as a monitor and/or an audio device such as a speaker). Multicast destinations 12(1)-12(2) can be personal computers, personal digital assistants, cell phones, network appliances, set top boxes, and the like.

In this example, edge nodes 16(1)-16(4) implement a Border Gateway Protocol (BGP). The BGP allows edge nodes to learn routes that lead to nodes that are outside of network 10. Edge nodes 16(1)-16(4) also participate in an Interior Gateway Protocol (IGP). The IGP facilitates the learning of routes within network 10.

Core nodes 18(1)-18(4) implement the IGP but do not implement the BGP. Accordingly, core nodes 18(1)-18(4) can learn routes within network 10, but cannot learn routes that lead to devices that are outside of network 10. Thus, core nodes 18(1)-18(4) cannot learn the route leading to a multicast source 14(1) or 14(2) without assistance, since multicast sources 14(1) and 14(2) are not located within network 10. This prevents the core nodes from being able to establish a multicast distribution tree with a multicast source (or any other device external to network 10) as its root, which can in turn prevent the core nodes from performing multicast routing for the multicast protocol messages that should be distributed along that multicast distribution tree.

In order to enable core nodes 18(1)-18(4) to establish multicast distribution trees having roots external to network 10, edge nodes 16(1)-16(4) provide information that is indicative of the route leading to the root of multicast distribution trees. The information includes information identifying a route (e.g., by identifying an edge node and/or one or more other nodes along the route) as well information identifying the multicast group with which that route is associated. This information is provided in messages that are sent from edge nodes 16(1)-16(4) to core nodes 18(1)-18(4). These messages can then be propagated among the core nodes.

In some embodiments, edge nodes 16(1)-16(4) provide route information to the core nodes in multicast treebuilding messages (i.e., multicast protocol messages that are used to build multicast distribution trees), such as multicast join and prune messages. For example, a "proxy field" can be defined for multicast join and prune messages, and route information can be included within this proxy field. In alternative embodiments, other types of messages can be used to convey this information instead of and/or in addition to multicast join and prune messages.

In one embodiment, each multicast join (or prune) message includes a tree identifier (TID), which is a value that is used by edge nodes to identify the tree to be built for a multicast group, and an RPF vector stack, which is a list of one or more nodes in the network that are located along the route to the root of the tree. For example, if the protocol used is PIM, then the TED could be (RP,G), where RP is the rendezvous point. For example, if the tree is a shortest-path tree, the TID can be (S, G), where S is the address of the multicast source and G is the address of the multicast group. If instead the tree is a shared tree, the TIC can be (*,G), where * is a wildcard value. If label-switched distribution trees are used, the TID could be a unique value (e.g., a fixed length numerical identifier) that does not necessarily correspond to the group address and/or RP address (if any).

Other fields can also be present in multicast join (and prune) messages (or other messages used to propagate route information from edge nodes to core nodes). For example, a tree type (TType) field can include a value (e.g., a binary flag or unique identifier) that identifies the type of tree (e.g., in one embodiment, possible tree types include point-to-multipoint (P2MP) and multipoint-to-multipoint (MP2MP)). Similarly, a policy field can include a value that specifies whether or not to use a policy when handling conflicts between that route information and other route information (as described in more detail below).

As an example, edge node 16(1) can send a multicast join message A to core node 18(1). Multicast join message A identifies that edge node 16(1) seeks to join the multicast group G. Multicast join message A also includes route information for the route leading to the root of the multicast distribution tree for multicast group G.

The route information includes information that a core node can use to establish a multicast distribution tree for the multicast group. In one embodiment, the route information simply includes the network address (e.g., the IP address) of the edge node that lies along the route to the root of the distribution tree. The identified edge node can also be described as the "exit point" node (i.e., the node that presents the exit point at which the route exits network 10). For example, multicast join message A can include route information that identifies the IP address of edge node 16(3). Alternatively, the route information can include information identifying more than one network node along the route (within network 10) that leads to the root of the multicast distribution tree. For example, multicast join message A can include route information that identifies the IP addresses of core node 18(1), core node 18(2), core node 18(4), and edge node 16[3]. Route information that identifies the each node along the route within network 10 is referred to as a Reverse Path Forwarding (RPF) vector stack.

When a core node, such as core node 18(1), receives route information for a multicast group from an edge node, the core node stores that information and then uses the route information to propagate the route information towards the root of the multicast distribution tree. The core node also constructs a multicast distribution tree by storing information identifying one or more outgoing interfaces (leading towards the leaves of the tree), information identifying an incoming interface (leading towards the root of the tree), and information identifying the multicast group address associated with the multicast distribution tree. In particular, the interface that receives a multicast group join message for a particular multicast group will be added to the list of outgoing interfaces. The interface that outputs messages towards the node(s) identified in the routing information provided by the edge node will be identified as the incoming interface.

When edge nodes are allowed to include routing information in multicast join messages, different edge nodes may specify conflicting routing information for the same multicast group. For example, edge node 16(1) can identify edge node 16(3) as being on the route leading to the root associated with a multicast group. Meanwhile, edge node 16(2) can identify edge node 16(4) as being on the path leading to the root associated with that same multicast group. In response to receiving route information from edge node 16(1), core node 18(1) establishes a multicast distribution tree such that the tree includes edge node 16(3). When route information is received from edge device 16(2), however, that core node will detect the conflicting information and re-build the multicast distribution tree to include edge node 16(4). The next time edge device 16(1) sends its route information to the core node, the process will begin again. If route information is propagated via join messages, which are periodically resent in order to avoid timing out, the process will repeat each time that the edge nodes resend the join messages.

Thus, conflicting information provided by different edge devices for the same multicast group can lead to core devices repeatedly updating state information associated with that multicast group, which can produce undesired results. For example, if a new incoming interface is identified in the recalculated multicast distribution tree, the core device may drop packets received via the incoming interface that was identified in the previous version of the tree, causing packet loss. Furthermore, recalculating a multicast distribution tree consumes resources within the node, and thus frequent recalculations may cause decreased performance.

In order to reduce undesirable behavior that occurs when different edge nodes provide conflicting route information for a particular multicast group, core nodes 18(1)-18(4) are configured to identify and resolve conflicts between conflicting route information. Thus, in response to receiving a set of conflicting route information for a multicast group from two or more edge nodes, a core node will resolve the conflict by building one or more versions of the multicast distribution tree for the multicast group in such a way that the core node will not need to recalculate the tree each subsequent time that the edge devices provide the same set of conflicting routing information to the core node. As described below, the core node can resolve a conflict between routing information received from different edge nodes using a variety of different techniques.

While the above discussion has focused on handling route information that corresponds to a route leading to the root of a multicast distribution tree, it is noted that similar techniques can be used to handle distribution trees that are used for purposes other than conveying multicast traffic.

Figure 2:
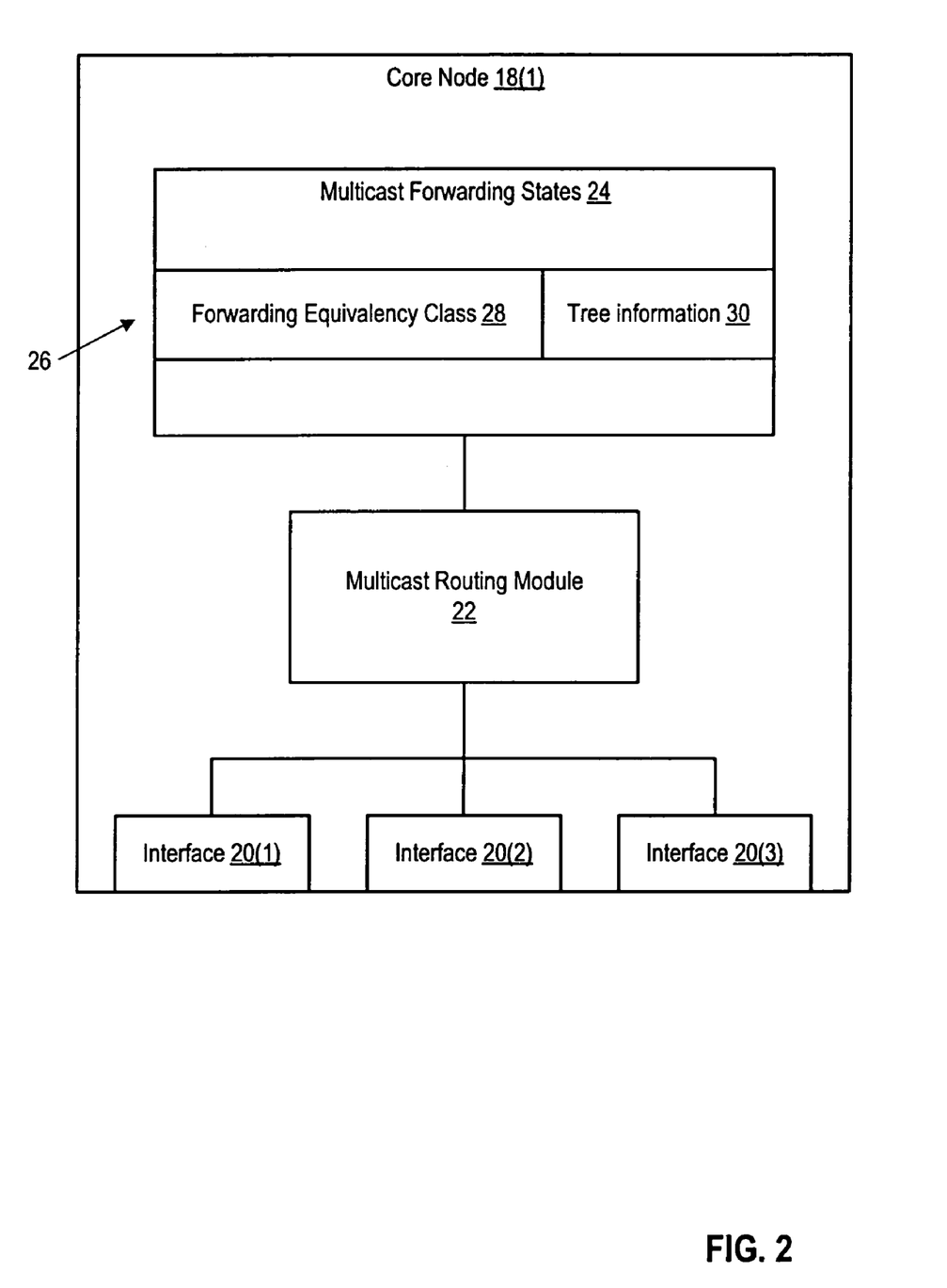
FIG. 2 shows a block diagram of a network device that performs multicast routing, according to one embodiment of the present invention.

FIG. 2 shows a block diagram of a core node 18(1) that performs multicast routing based on route information received from an edge node. As noted above, this route information can be received in a multicast join message (or any other message). As shown, core node 18(1) includes several interfaces 20(1)-20(2), a multicast routing module 22, and a memory device for storing multicast forwarding states 24.

The multicast routing module 22 is coupled to the interfaces, so that the multicast routing module 22 can process multicast messages and/or control how multicast messages are communicated between interfaces 20(1)-20(3). It is noted that this coupling can be indirect (e.g., the interfaces can be distributed among several line cards, while the multicast routing module is located on another card), in some embodiments.

Multicast routing module 22 can update multicast forwarding states 24 in response to receiving new route information, generated by edge nodes, and/or multicast join messages. As shown, a multicast forwarding state entry 26 includes a forwarding equivalency class 28 and tree information 30. Forwarding equivalency class 28 is an identifier that uniquely identifies a multicast distribution tree. Tree information 30 is information that describes a multicast distribution tree, as calculated by multicast routing module 22. For example, after calculating a multicast distribution tree, multicast routing module 22 can store information identifying the multicast group address, source address (if the multicast distribution tree is a shortest-path tree), incoming interface, and outgoing interfaces as tree information 30.

In some embodiments, forwarding equivalency class 28 is a concatenated value made up of the tree type, optional route information, and tree identifier. These three values are obtained from join and prune messages as well as routing information provided by edge nodes. The tree type is a value indicates the type of tree (e.g., P2MP or MP2MP). The route information, as described above, is a set of one or more values that each identifies a node along the route towards the root of the multicast distribution tree. The tree identifier is a set of one or more values (e.g., multicast group address and, for shortest-path trees, source address) that are used to distinguish different multicast distribution trees from each other.

In some embodiments, core node 18(1) uses a predesignated policy to resolve conflicts between route information. For example, if two pieces of route information, each corresponding to the same multicast distribution tree, are received from two different edge nodes, the predesignated policy can be used to select one of the two pieces of route information. The selected piece of route information is used to calculate a single multicast distribution tree, which is then used to convey multicast traffic to both of the edge devices.

In these embodiments, core node 18(1) does not include the route information in the forwarding equivalency class. Instead, core node 18(1) uses a value that corresponds to an invalid set of route information (e.g., an invalid RPF vector stack) to form the forwarding equivalency class. The same value is used for all forwarding equivalency classes that have the same tree ID, such that all pieces of route information that correspond to the same multicast distribution tree will have the same forwarding equivalency class.

As an example, a first piece of route information R1 corresponding to multicast distribution tree A can be received via interface 20(1) from a first edge node. A conflicting piece of route information R2 that corresponds to the same multicast distribution tree can be received via interface 20(2) from a second edge node. Routing module 22 stores a copy of both pieces of route information (e.g., for use in resolving a subsequent conflict if yet another different piece of route information is received for that multicast distribution tree). Upon receiving the conflicting piece of routing information (i.e., whichever of R1 and R2 is received later), routing module 22 uses a predesignated policy to select either R1 or R2. If, for example, the policy selects R1, routing module 22 will build the multicast distribution tree based on the information provided in R1. That multicast distribution tree is then used to route multicast traffic to both the first and the second edge nodes. Thus, in this example, the second edge node will not receive multicast traffic from the source and/or along the route that the second edge node specified. Additionally, routing module 22 will use the selected route information (R1 in this example) in the joins that routing module 22 sends towards the source. The non-selected route information will not be included in joins sent by core node 18(1).

The predesignated policy is any policy that is designed to select a single piece of route information from a set (i.e., a collection of two or more pieces of route information) of route information that corresponds to the same multicast distribution tree. One example is a policy that uses the node identifiers of the edge nodes that provide the route information to select a piece of route information. For example, the route information provided by the edge node with the highest node identifier can be selected. The node identifier is an identity (e.g., an IP source address used in join and prune messages) that is known at core node 18(1) for each downstream node from which core node 18(1) receives join or prunes.

If the node with the highest node identifier prunes from the tree, then multicast routing module 22 access the saved route information and selects the route information provided by the node with the next highest node identifier. Multicast routing module 22 updates the tree information to correspond to the newly selected route information as well as sends one or more joins specifying the new route information. Multicast routing module 22 also sends a prune specifying the old route information (as provided by the node that has been pruned).

Another example is a policy that selects route information based on the node identifiers that are included in the route information. For example, if each piece of route information identifies a different edge node along the route that leads to the root of the tree, this policy can compare the node identifiers of the edge nodes. The policy can specify that the route information with the highest edge node identifier is the route information to select. If each piece of route information includes several node identifiers Nn, N(n−1), . . . N1, where Nn is the edge node closest to the root of the tree and N1 is the core node closest to the edge node that generated the route information, the policy can select the route information with the highest Nn. If multiple pieces of route information have the same Nn, the policy can select the one with the highest N(n−1), and so on. If the network has redundant paths, then the policy can be configured to select among the node identifiers in a way that gives preference to certain paths and/or nodes.

In other embodiments, core node 18(1) resolves conflicts without the use of a predesignated policy. This type of conflict resolution is referred to herein as "policy-free" conflict resolution. In these embodiments, core node 18(1) includes the RPF vector stack (or other route information, if fewer than all of the intra-network nodes along the route are identified) as part of the forwarding equivalency state. Thus, when policy-free conflict resolution is used, there can be multiple different forwarding equivalency states for the same multicast distribution tree. Routing module 22 then calculates a different version of the multicast distribution tree for each different forwarding equivalency state.

Thus, when policy-free conflict resolution is used, each core node will build a different distribution tree whenever different pieces of route information (e.g., different RPF vector stacks and/or tree types) are received for the same multicast distribution tree from different edge nodes. Accordingly, each edge node will receive the multicast stream from the source and/or via the route that each edge node indicates in the route information. In contrast to policy-based conflict resolution, core nodes' behavior does not influence the selection of the source and/or route in "policy free" conflict resolution.

When policy-free conflict resolution is used, several different versions of a given multicast distribution tree may be in use at the same time. If the different versions of the tree overlap (e.g., if the same link is included in more than one of the versions), the same traffic may be carried across a single link more than once. Policy free conflict handling can only be supported when the forwarding plane that is used to deliver multicast traffic along the multicast distribution tree provides the same amount of route information as the forwarding equivalency class. For example, if the forwarding equivalency class includes an RPF vector stack identifying multiple nodes, and Multi-Protocol Label Switching (MPLS) is being used to distribute the multicast data stream, the information provided in the MPLS headers can be used to select an appropriate version of the multicast distribution tree, based on the forwarding equivalency class. If instead native IP multicast forwarding is being used, forwarding is based on incoming interface and the IP source address provided in the header. This may not be enough information to differentiate between different forwarding equivalency classes. In order to avoid such situations, some embodiments only implement policy-free conflict resolution when a protocol such as MPLS is used.

In some embodiments, multicast routing module 22 uses both policy-free and policy-based conflict resolution at the same time. In such embodiments, edge nodes include a flag in the route information that indicates a particular type of conflict resolution. Thus, for the same multicast distribution tree, two edge nodes A and B could select policy-free conflict resolution, while two other edge nodes C and D select policy-based conflict resolution. Accordingly, multicast routing module 22 could calculate up to three versions of that multicast distribution tree. One version would be used to provide multicast traffic to edge nodes C and D. If edge nodes C and D provide conflicting pieces of route information, multicast routing module 22 will use a policy to select one piece of route information from which to calculate this version of the tree. The forwarding equivalency class for this version of the tree will have an invalid value in place of the route information. Since edge nodes A and B have indicated policy-free conflict resolution, a different version of the tree can be calculated for each of nodes A and B, if these nodes provide conflicting route information. The forwarding equivalency class for each of these versions of the tree will include the respective route information received from nodes A and B.

While the above examples have described resolving conflicts between route information received from edge nodes, it is noted that the same techniques can be used to resolve conflicts between route information provided by one or more core nodes and/or edge nodes. As noted above, core nodes can propagate route information (initially generated by an edge node) to other core nodes. Thus, conflicts can also arise between route information provided by multiple core nodes and/or between a core node and an edge node. The above conflict resolution techniques can be used to resolve such conflicts.

Figure 3:
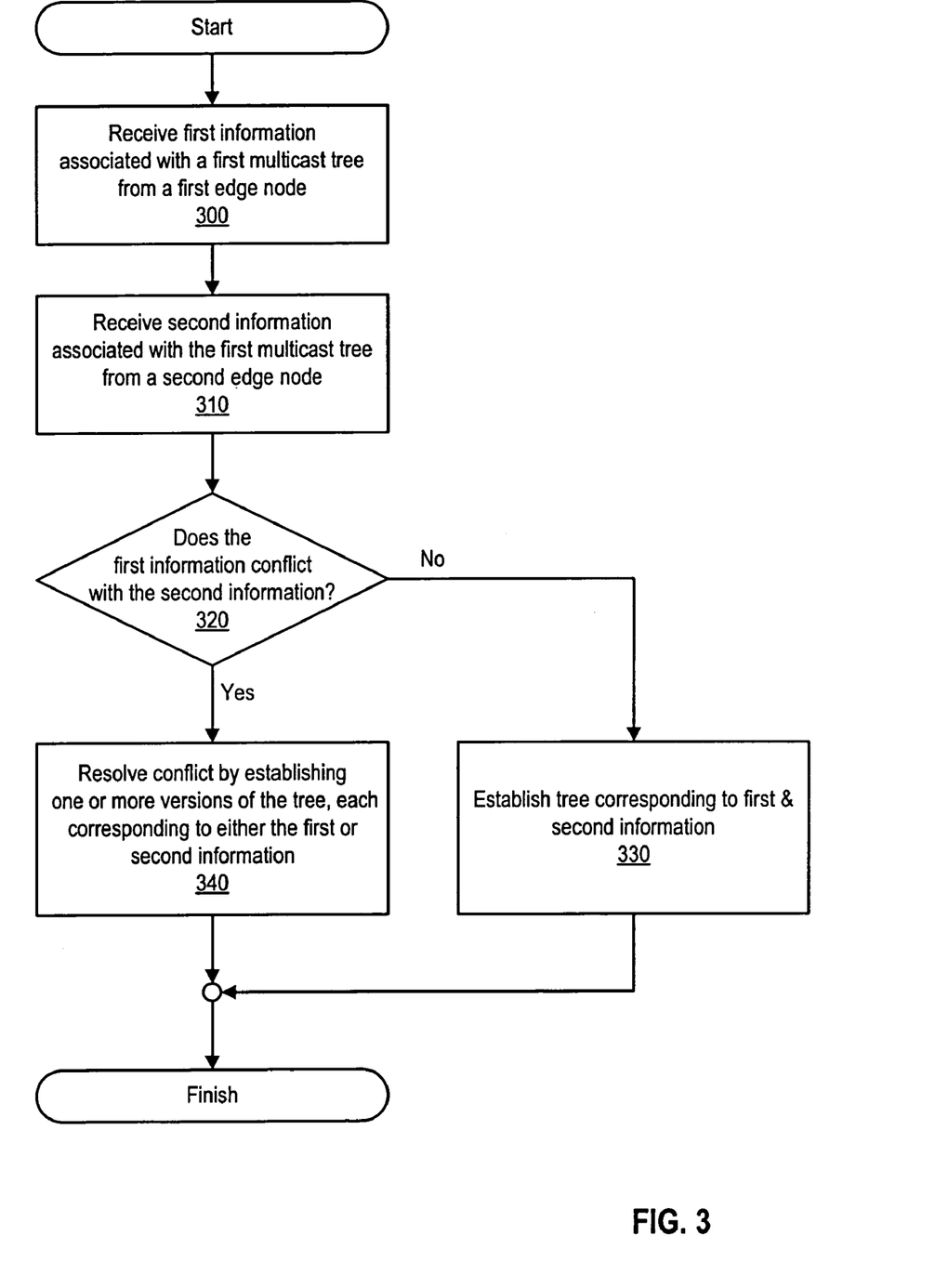
FIG. 3 is a flowchart of a method of resolving conflicts between routing information associated with a multicast distribution tree, according to one embodiment of the present invention.

FIG. 3 is a flowchart of a method of resolving conflicts between routing information associated with a multicast distribution tree. This method is performed by a core node, such as core node 18(1) of FIG. 2. The method begins at 300, when a core node receives first route information, which is associated with a first multicast tree, from a first edge node. At 310, the core node receives second route information, which is also associated with the first multicast tree, from a second edge node. In one embodiment, the first and second route information is included in respective multicast join messages received by the core node.

The core node can determine whether the first route information conflicts with the second route information, as indicated at 320. A conflict exists if the first and second route information differ in a manner that affects how the core node will calculate the multicast distribution tree. For example, if the first route information specifies that node B is part of the route leading to the root of the distribution tree, but the second route information specifies that node C is part of the route instead of node B, and if the core node uses a different interface to send messages to node B and node C, a conflict exists. Similarly, if the first route information identifies the multicast distribution tree as being a P2MP tree, but the second route information identifies the multicast distribution tree as a being a MP2MP tree, a conflict exists.

The core node can detect the conflict by either directly comparing the first and second route information, as received from the edge nodes, or by comparing the latest-received route information with a multicast distribution tree calculated from the earlier-received route information. For example, in one embodiment, the core node stores a copy of each unique piece of route information received from an edge node, as well as information identifying the edge node(s) that provided that route information. Accordingly, each time that the core node receives route information, the core node can compare the received route information to the stored information. If the received information is consistent with each piece of stored information that corresponds to the same multicast distribution tree, no conflict is detected; if not, the core node detects a conflict.

In alternative embodiments, the first time that the core node receives route information for a given multicast distribution tree, the core node calculates the multicast distribution tree and stores information (e.g., incoming interface, outgoing interface, and multicast group address, type of tree (2 MP or MP2MP), TID, and the like) corresponding to the calculated multicast distribution tree. Subsequently, each time route information corresponding to that multicast distribution tree is received, the core node can compare the route information to the stored information. If the received information is consistent with the stored information (e.g., if the incoming interface for the multicast distribution tree leads to the node identified in the route information, and so on), no conflict is present. If not, a conflict is detected.

If no conflict is detected, the core node simply establishes a single tree (if such a tree has not already been established) that corresponds to the first and second route information, as shown at 330. If instead a conflict is detected, the core node resolves the conflict by establishing one or more versions of the tree, as shown at 340. Each version of the tree that is established by the core node corresponds to a single piece of (i.e., either the first or second) route information. Resolving the conflict involves establishing one or more versions of the tree in such a way that recalculation of the tree(s) will not be necessary the next time that the core node receives the first and second route information.

After resolving the conflict at 340, if the same pieces of conflicting route information (the first and second route information of FIG. 3) are again received, the core node may again detect a conflict. However, the core node will not need to recalculate the multicast distribution tree, since the resulting version(s) of the tree would be the same as the one(s) calculated at 330. In embodiments that store copies of each piece of unique route information, the core node can determine whether a conflict is a new conflict (i.e., a conflict that has already been resolved) based on whether a copy of the received route information is already stored. In such embodiments, the core node can perform conflict resolution for new conflicts only. Thus, the multicast distribution tree will not be recalculated for conflicts that have already been resolved.

Figure 4:
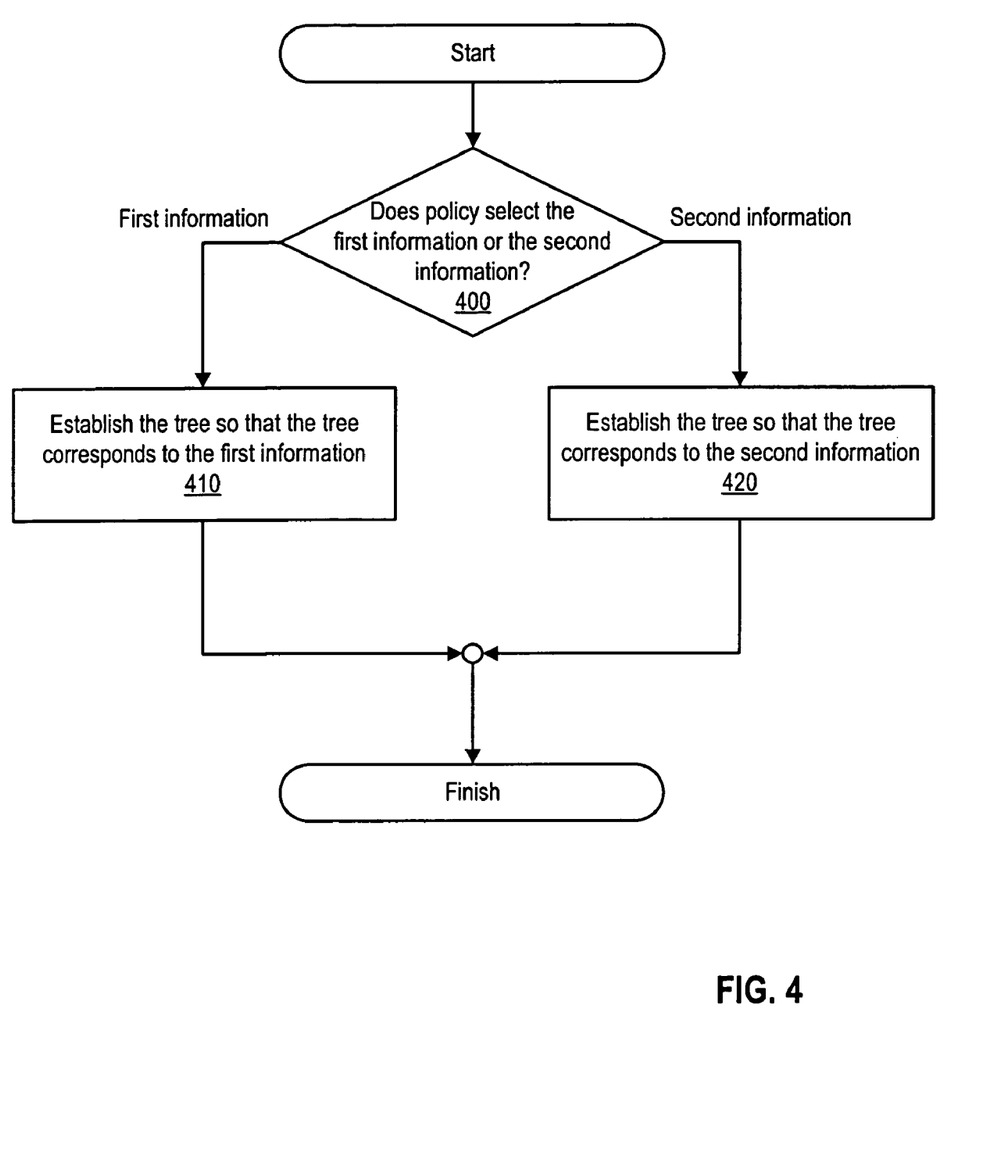
FIG. 4 is a flowchart of one embodiment of a method of resolving conflicts between routing information that involves using a policy to select one version of the routing information.

As noted above, in some embodiments, the core node will resolve a conflict by establishing a single multicast distribution tree. FIG. 4 is a flowchart of a method of resolving conflicts between routing information that involves using a policy to select one version of the routing information. This method can be performed by a multicast routing module (or other routing module, if trees used for purposes other than conveying multicast traffic are being handled), such as routing module 22 of FIG. 2. This method can be used to perform function 340 of FIG. 3.

The method begins at 400, when the core node determines whether the policy selects the first route information or the second route information (it is noted that the policy can be used to select among more than two pieces of route information). The policy is a prespecified policy that is used to handle all conflicts between pieces of route information received by the core node. The policy can be based on any one or more of a variety of factors, including the node identifiers (e.g., IP addresses) of the nodes that send the route information or the node identifiers specified within the route information itself.

If the policy selects the first route information, the core node establishes the tree in a way that corresponds to the first route information, as indicated at 410. For example, if the first route information identifies a path that is reached via a first interface and the second route information identifies a path that is reached via the second interface, that core node will use the first interface as the incoming interface for the tree. If instead the policy selects the second route information, the core node establishes the tree in a way that corresponds to the second information, as shown at 420 (e.g., by using the second interfaces as the incoming interface for the tree).

Figure 5:
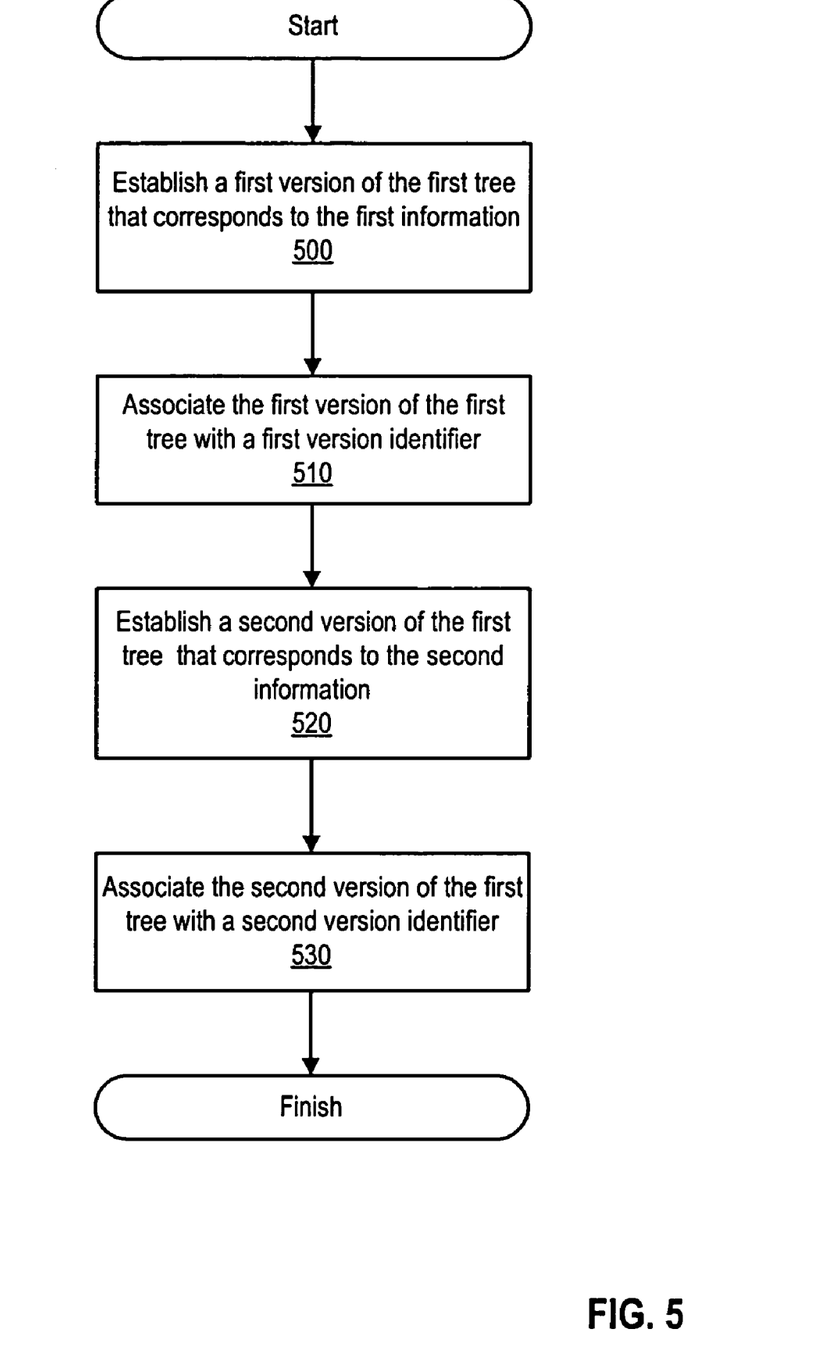
FIG. 5 is a flowchart of an embodiment of another method of resolving conflicts between routing information that involves building several versions of a multicast distribution tree.

In other embodiments, the core node will resolve a conflict by establishing several versions of the same multicast distribution tree. FIG. 5 is a flowchart of a method of resolving conflicts between routing information that involves building several versions of a multicast distribution tree. This method can be performed by a multicast routing module (or other routing module, if trees used for purposes other than conveying multicast traffic are being handled), such as routing module 22 of FIG. 2. This method can be used to perform function 340 of FIG. 3.

In this embodiment, the core node establishes a first version of the tree that corresponds to the first information, as shown at 500. At 510, the core node associates this version of the tree with a first version identifier (e.g., a forwarding equivalency class, as described above). The version identifier can include a tree identifier, as well as additional information (e.g., an RPF vector stack or other route information) that can be used to distinguish among trees having the same tree identifier.

Similarly, at 520, a second version of the tree is established for the second route information. This second version of the tree is associated with a second version identifier, as shown at 530. The core node uses the first version of the tree to send the multicast stream to nodes that provided the first route information and the second version of the tree to send the multicast stream to nodes that provided the second route information.

It is noted that in some embodiments, core nodes can resolve conflicts by selectively using either a method similar to of FIG. 4 or a method similar to FIG. 5. For example, as described above, each message (e.g., each multicast join message) that includes proxy route information sent by an edge node can include information (e.g., a bit or flag) indicating whether policy-based or policy-free conflict resolution should be used to handle any conflicts in which that route information is involved. This information controls how the core node performs conflict resolution (e.g., by controlling how the core node stores tree identifiers, as described above).

Figure 6:
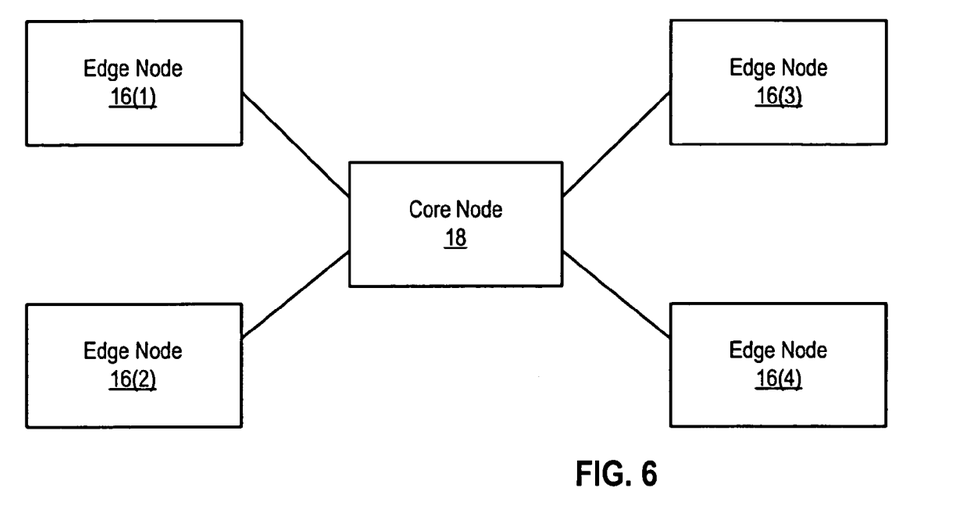
FIG. 6 is a block diagram of a network that includes proxy routing information in multicast join messages, according to one embodiment of the present invention.

FIG. 6 is a block diagram of a network that includes proxy routing information in multicast join messages. In this example, four edge nodes 16(1)-16(4) are coupled by a core node 18. Edge nodes 16(1) and 16(2) are downstream nodes, or nodes that are closer to multicast destinations. Edge nodes 16(3) and 16(4) are upstream nodes, or nodes that are closer to multicast sources.

Several types of conflicts can arise in the network of FIG. 6. For example, edge nodes 16(1) and 16(2) can send join messages that identify conflicting RPF vector stacks and/or upstream edge nodes for the same multicast tree. Edge node 16(1) can, for example, send a join message specifying multicast group G and edge node 16(3), indicating that edge node 16(1) wants to receive the multicast stream addressed to G via the route that includes edge node 16(3). At the same time, edge node 16(1) can send a join message specifying multicast group G and edge node 16(4).

To resolve the conflict between the pieces of route information provided by edge nodes 16(1) and 16(2), core node 18 can either select one piece of route information and construct a single multicast tree or construct different versions of the tree in response to each join. In the former situation, core node 18 can, for example, select (e.g., using a predesignated policy provided by a network administrator) to construct the multicast distribution tree for group G using the route information provided by edge node 16(1). Core node 18 will send a join upstream (e.g., to edge node 16(3)) based on the selected route information. No join will be sent based on the non-selected route information (i.e., no join will be sent to edge node 16(4)). Accordingly, both edge nodes 16(1) and 16(2) will receive the multicast stream via the tree indicated by edge node 16(1).

In the latter situation, core node 18 constructs two versions of the tree—one for each of the conflicting join messages. Additionally, core node 18 can send a join upstream for each different version of the tree. Accordingly, multicast traffic sourced via edge node 16(3) is provided to edge node 16(1), while multicast traffic sourced via edge node 61(4) is provided to edge node 16(2).

Another example of a conflict that can arise in the network of FIG. 6 involves the downstream edge nodes specifying the same upstream edge node and/or RPF vector stack but different tree types. For example, edge node 16(1) can send a multicast join message for multicast group G that specifies a P2MP tree and edge node 16(1). Edge node 16(2) can send a conflicting join message for multicast group G that specifies a MP2MP tree and edge node 16(1). Core node 18 can resolve this conflict by either selecting one tree type (using a policy) and constructing a single tree of the selected type, or by constructing two different versions of the same tree, each version having a different type.

Figure 7:
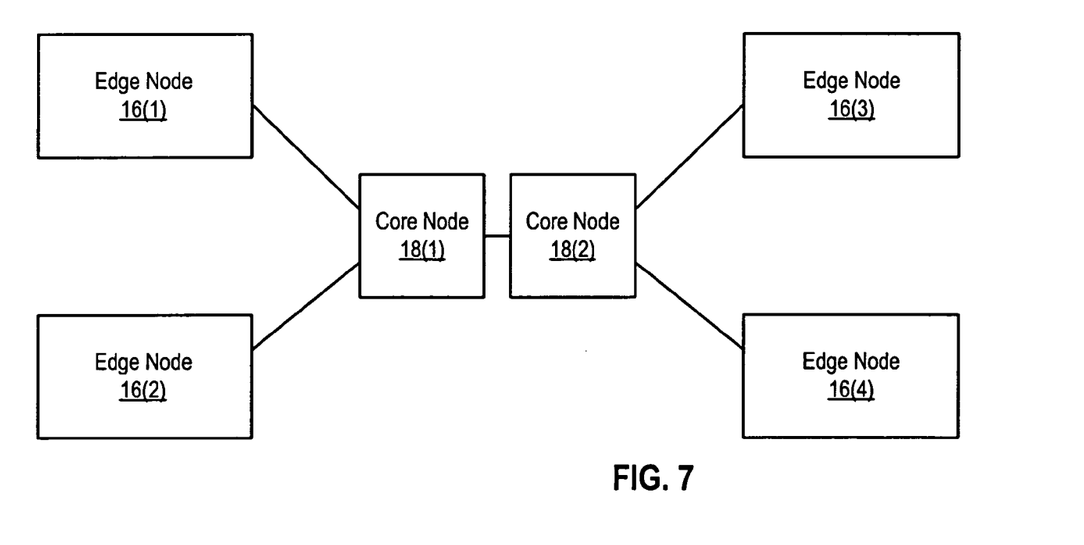
FIG. 7 is a block diagram of another network that includes proxy routing information in multicast join messages, according to one embodiment of the present invention.

FIG. 7 is a block diagram of another network that includes proxy routing information in multicast join messages. In this example, there are two core nodes 18(1) and 18(2) in place of the single core not shown in FIG. 6. A conflict can occur if each downstream edge node specifies a different edge node for the same MP2MP multicast distribution tree. For example, edge node 16(1) can specify that edge node 16(3) is the edge node leading to the root of the tree, while edge node 16(2) can specify that edge node 16(4) is the edge node leading to the root of the tree. Core node 18(1) can resolve the conflict by either using a policy to select one particular set of route information, and then constructing a single tree and sending a single join that correspond to that route information, or by constructing a different version of the tree for each different piece of route information.

Figure 8:
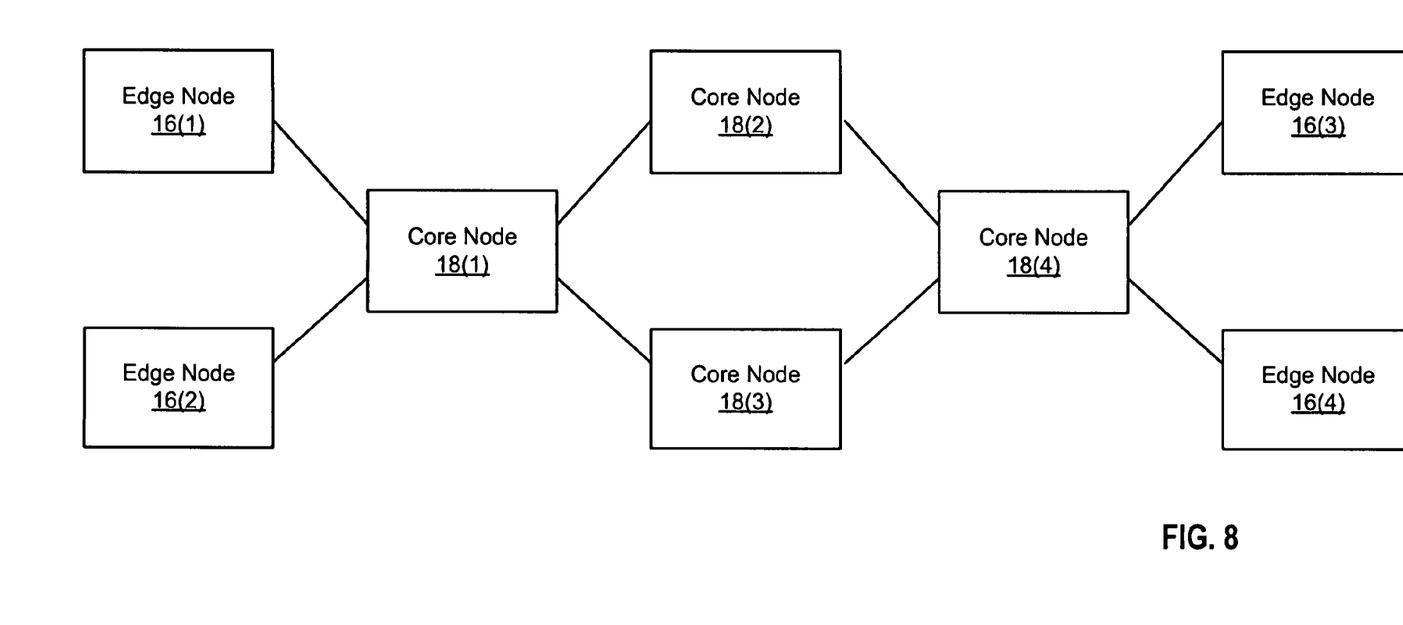
FIG. 8 is a block diagram of yet another network that includes proxy routing information in multicast join messages, according to one embodiment of the present invention.

FIG. 8 is a block diagram of yet another network that includes proxy routing information in multicast join messages. In this example, core node 18 of FIG. 6 has been replaced with four core nodes 18(1)-18(4). A conflict can arise in this network arises when the downstream edge nodes specify different RPF vector stacks. For example, edge node 16(1) can specify the following RPF vector stack: edge node 16(3), core node 18(4), core node 18(2), and core node 18(1). Edge node 16(2) can specify a different RPF vector stack for the same tree: edge node 16(4), core node 18(4), core node 18(3), and core node 18(1). Core node 18(1) can resolve the conflict between the RPF vector stacks using either policy-based or policy-free conflict resolution. In the former situation, core node 18(1) selects one RPF vector stack, and then sends a join upstream that specifies the selected vector stack. Core node 18(1) also constructs a single version of the tree corresponding to that RPF vector stack. In the latter situation, core node 18(1) constructs a different version of the tree for each RPF vector stack. Core node 18(1) also sends two different joins: a join specifying the RPF vector stack provided by edge node 16(1) is sent to core node 18(2), while a join specifying the RPF vector stack provided by edge node 16(1) is sent to core node 18(3). It is noted that core node 18(4) can receive conflicting route information from core nodes 18(1) and 18(3). Core node 18(4) can resolve the conflict using the techniques described above.

Figure 9:
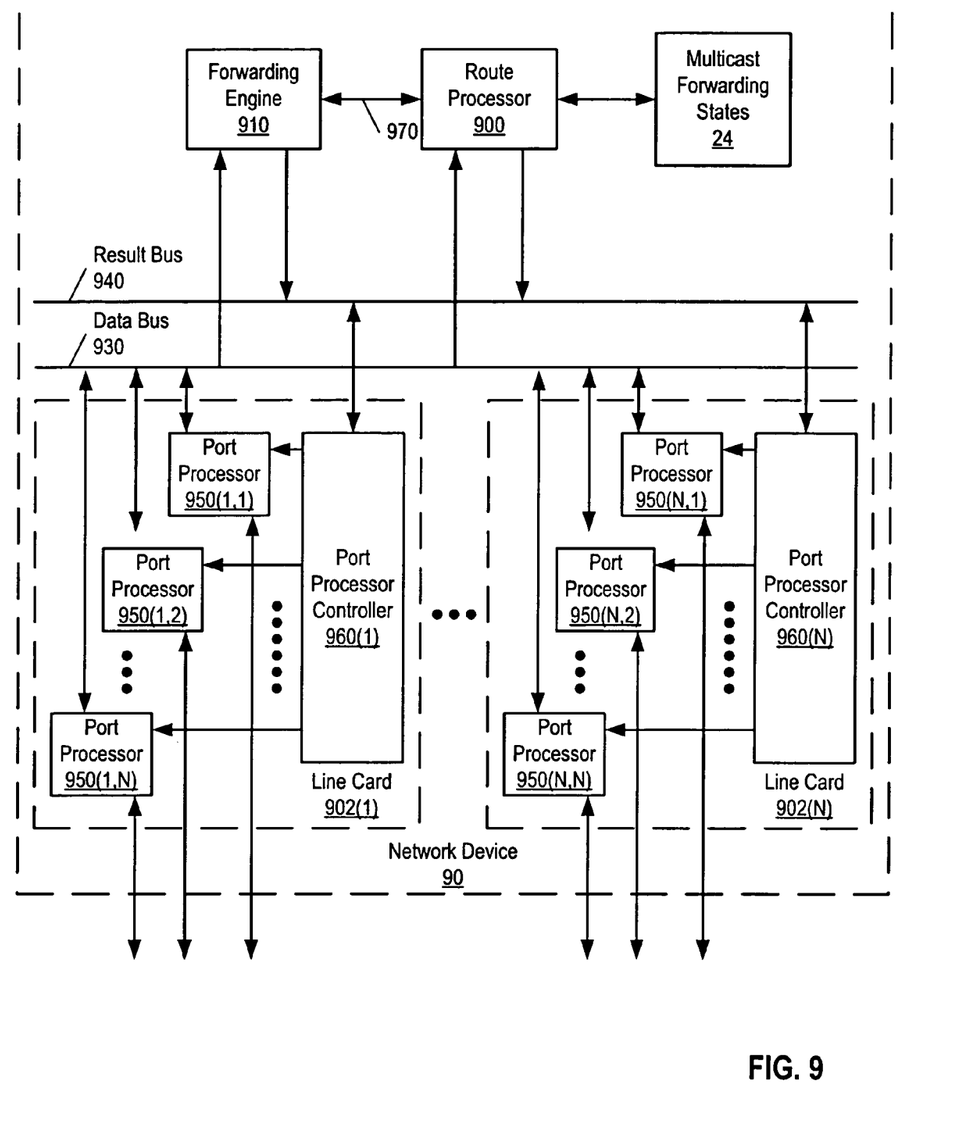
FIG. 9 is a block diagram of a network device, according to one embodiment of the present invention.

FIG. 9 is a block diagram of a network device 90 (e.g., one of core nodes 18(1)-18(4) of FIG. 1). In this depiction, network device 90 includes a number of line cards (line cards 902(1)-902(N)) that are communicatively coupled to a forwarding engine 910 and a route processor 900 via a data bus 930 and a result bus 940. Routing processor 900 can include multicast routing module 22 (of FIG. 2) and maintains multicast forwarding states 24 in a memory device. Routing processor 900 can perform policy-free and/or policy based conflict resolution for conflicting route information, as described above.

Line cards 902(1)-902(N) include a number of port processors 950(1,1)-950(N,N) which are controlled by port processor controllers 960(1)-960(N). It will also be noted that forwarding engine 910 and route processor 900 are not only coupled to one another via data bus 930 and result bus 940, but are also communicatively coupled to one another by a communications link 970. It is noted that in alternative embodiments, each line card can include a forwarding engine.

When a message is received, the message is identified and analyzed by a network device such as network device 90 in the following manner, according to embodiments of the present invention. Upon receipt, a message (or some or all of its control information) is sent from the one of port processors 950(1,1)-950(N,N) at which the message was received to one or more of those devices coupled to data bus 930 (e.g., others of port processors 950(1,1)-950(N,N), forwarding engine 910 and/or route processor 900). Handling of the message can be determined, for example, by forwarding engine 910. For example, forwarding engine 910 may determine that the message should be forwarded to one or more of port processors 950(1,1)-950(N,N). This can be accomplished by indicating to corresponding one(s) of port processor controllers 960(1)-960(N) that the copy of the message held in the given one(s) of port processors 950(1,1)-950(N,N) should be forwarded to the appropriate one of port processors 950(1,1)-950(N,N).

Figure 10:
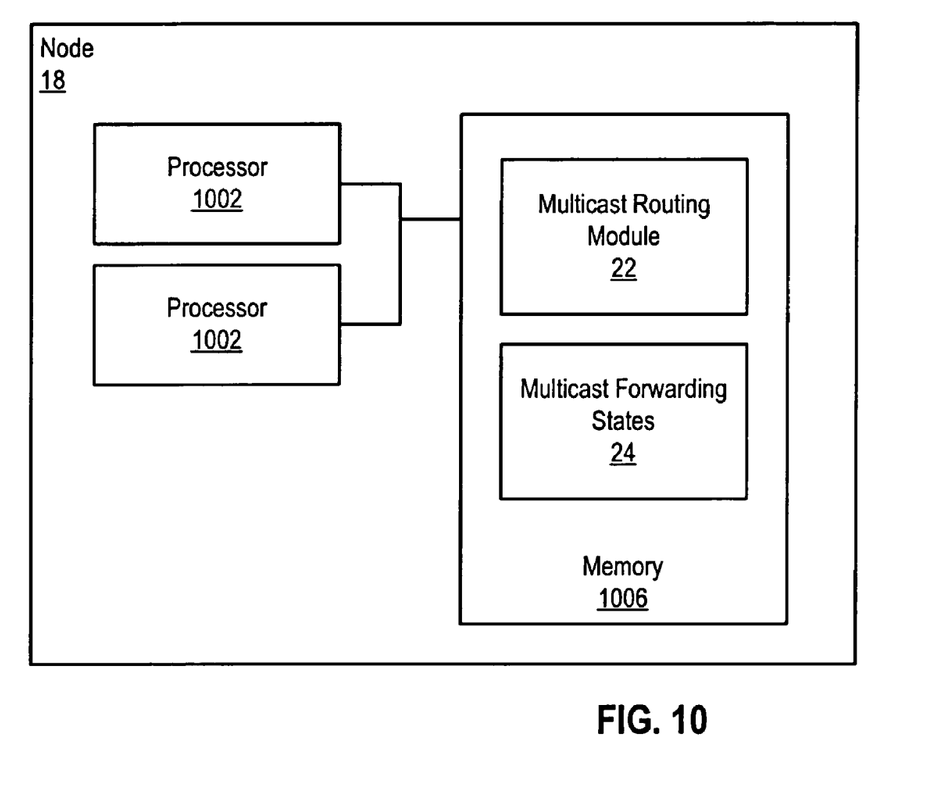
FIG. 10 is another block diagram of a network device, according to one embodiment of the present invention.

FIG. 10 illustrates a block diagram of a node 18 (e.g., one of core nodes 18(1)-18(4) of FIG. 1), which illustrates how multicast routing module 22 can be implemented in software. As illustrated, node 18 includes one or more processors 1002 (e.g., microprocessors, PLDs (Programmable Logic Devices), or ASICs (Application Specific Integrated Circuits)) configured to execute program instructions stored in memory 806. Memory 1006 can include various types of RAM (Random Access Memory), ROM (Read Only Memory), Flash memory, MEMS (Micro Electro-Mechanical Systems) memory, and the like. Processor 1002 and memory 1006 can be included in a route processor (e.g., route processor 900 of FIG. 9). Processor 1002 and memory 1006 are coupled to send and receive data and control signals by a bus or other interconnect.

In this example, program instructions executable to implement multicast routing module 22 are stored in memory 1006. Additionally, information that makes up an multicast forwarding states 24 can also be stored in memory 1006 for use by routing module 22. The program instructions and data implementing routing module 22 can be stored on various computer readable media such as memory 1006. In some embodiments, routing module 22 software is stored on a computer readable medium such as a CD (Compact Disc), DVD (Digital Versatile Disc), hard disk, optical disk, tape device, floppy disk, and the like). In order to be executed by processor 1002, the instructions and data implementing routing module 22 are loaded into memory 1006 from the other computer readable medium. The instructions and/or data implementing routing module 22 can also be transferred to node 18 for storage in memory 1006 via a network such as the Internet or upon a carrier medium. In some embodiments, a computer readable medium is a carrier medium such as a network and/or a wireless link upon which signals such as electrical, electromagnetic, or digital signals, on which the data and instructions implementing routing module 22 are encoded, are conveyed.

For purposes of this disclosure, a "message" may include a cell, datagram, frame, packet, segment, or any other logical group of information that is conveyed via a network. Network devices perform switching and routing functions in order to convey messages from a source to a destination along a path.

Although the present invention has been described in connection with several embodiments, the invention is not intended to be limited to the specific forms set forth herein. On the contrary, the present invention is intended to cover such alternatives, modifications, and equivalents as can be reasonably included within the scope of the invention as defined by the appended claims.

What is claimed is:

1. A method comprising:
   receiving a first message from a first network device, wherein
      the first message identifies a first distribution tree,
      the first message is received by a core node, and
      the first message comprises first information associated with a first route leading from the core node to a root of the first distribution tree;
   receiving a second message from a second network device, wherein
      the second message identifies the first distribution tree,
      the second message comprises second information associated with a second route leading from the core node to the root of the first distribution tree, and
      each of the first message and the second message is one of: a multicast join message or a multicast prune message; and
   resolving a conflict between the first information and the second information.

2. The method of claim 1, wherein
   the resolving the conflict comprises calculating at least one version of the first distribution tree, and
   the at least one version of the first distribution tree is not recalculated in response to subsequently receiving additional copies of the first information and the second information from the first network device and the second network device respectively.

3. The method of claim 2, wherein
   the first information identifies a first node as being located on the first route leading to the root of the first distribution tree; and
   the second information does not identify the first node as being located on the second route leading to the root of the first distribution tree.

4. The method of claim 1, wherein
   the first information identifies a first reverse path forwarding (RPF) vector stack; and
   the second information identifies a second RPF vector stack.

5. The method of claim 1, wherein
   the first information specifies that the first distribution tree is a point-to-multipoint tree; and
   the second information specifies that the first distribution tree is a multipoint-to-multipoint tree.

6. The method of claim 1, wherein the resolving the conflict between the first information and the second information comprises:
   building a first version of the first distribution tree in response to the first information; and
   building a second version of the first distribution tree in response to the second information, wherein
      the first version of the first distribution tree is used to forward multicast packets to the first network device but is not used to forward multicast packets to the second network device, and
      the second version of the first distribution tree is used to forward multicast packets to the second network device but is not used to forward multicast packets to the first network device.

7. The method of claim 1, wherein the resolving the conflict between the first information and the second information comprises:
   selecting one of the first information and the second information, based on a policy; and
   building the first distribution tree in response to the selected one of the first information and the second information.

8. The method of claim 7, wherein
   the selecting the one of the first information and the second information, based on the policy, comprises:
      selecting the first information if an identifier of the first network device is greater than an identifier of the second network device.

9. A system comprising:
   a core node comprising:
   one or more interfaces, the one or more interfaces configured to receive a first message from a first network device and a second message from a second network device, wherein
      each of the first message and the second message is one of: a multicast join message or a multicast prune message, the first message comprises first information associated with a first route leading from the core node to a root of a first distribution tree, the second message comprises second information associated with a second route leading from the core node to the root of the first distribution tree, and the first information differs from the second information; and a routing module coupled to the one or more interfaces, wherein the routing module is configured to calculate at least one version of the first distribution tree in response to the first information and the second information, and the at least one version of the first distribution tree is not recalculated in response to subsequently receiving additional copies of the first information and the second information from the first network device and the second network device respectively.

10. The system of claim 9, wherein the routing module is configured to:

calculate a first version of the first distribution tree in response to the first information; and calculate a second version of the first distribution tree in response to the second information, wherein the first version of the first distribution tree is used to forward multicast packets to the first network device but is not used to forward multicast packets to the second network device, and the second version of the first distribution tree is used to forward multicast packets to the second network device but is not used to forward multicast packets to the first network device.

11. The system of claim 9, wherein the routing module is configured to:

select one of the first information and the second information, based on a policy; and calculate the first distribution tree in response to the selected one of the first information and the second information.

12. The system of claim 11, wherein the routing module is configured to select the first information if an identifier of the first network device is greater than an identifier of the second network device.

13. A system comprising:

a first network node;

a second network node; and a third network node coupled to the first network node and the second network node, wherein the third network node is configured to:

receive a first message comprising first information from the first network node and a second message comprising second information from the second network node, wherein each of the first message and the second message is one of: a multicast join message or a multicast prune message, the first information and the second information are each associated with a respective route leading from the third node to a root of a first distribution tree, and the first information differs from the second information;

calculate at least one version of the first distribution tree in response to the first information and the second information, wherein the third network node does not recalculate the at least one version of the first distribution tree in response to subsequently receiving additional copies of the first information and the second information from the first network node and the second network node respectively.

14. The system of claim 13, wherein the third node is configured to:

calculate a first version of the first distribution tree in response to the first information; and calculate a second version of the first distribution tree in response to the second information, wherein the first version of the first distribution tree is used to forward multicast packets to the first network node but is not used to forward multicast packets to the second network node, and the second version of the first distribution tree is used to forward multicast packets to the second network node but is not used to forward multicast packets to the first network node.

15. The system of claim 13, wherein the third node is configured to:

select one of the first information and the second information, based on a policy; and calculate the first distribution tree in response to the selected one of the first information and the second information.

16. The system of claim 15, wherein the third node is configured to select the first information if an identifier of the first network node is greater than an identifier of the second network node.

17. A system comprising:

a core node comprising:

means for receiving a first message from a first network device, wherein the first message identifies a first distribution tree, and the first message comprises first information associated with a first route leading from the core node to a root of the first distribution tree;

means for receiving a second message from a second network device, wherein the second message identifies the first distribution tree, the second message comprises second information associated with a second route leading from the core node to the root of the first distribution tree, and each of the first message and the second message is one of: a multicast join message or a multicast prune message; and means for resolving a conflict between the first information and the second information.

* * * * *